G. L. SUMMERS.
DEMOUNTABLE RIM FOR AUTO WHEELS.
APPLICATION FILED MAR. 8, 1918.

1,292,139.

Patented Jan. 21, 1919.
2 SHEETS—SHEET 1.

Inventor
G. L. Summers

By D. Swift &
his Attorneys

Witnesses

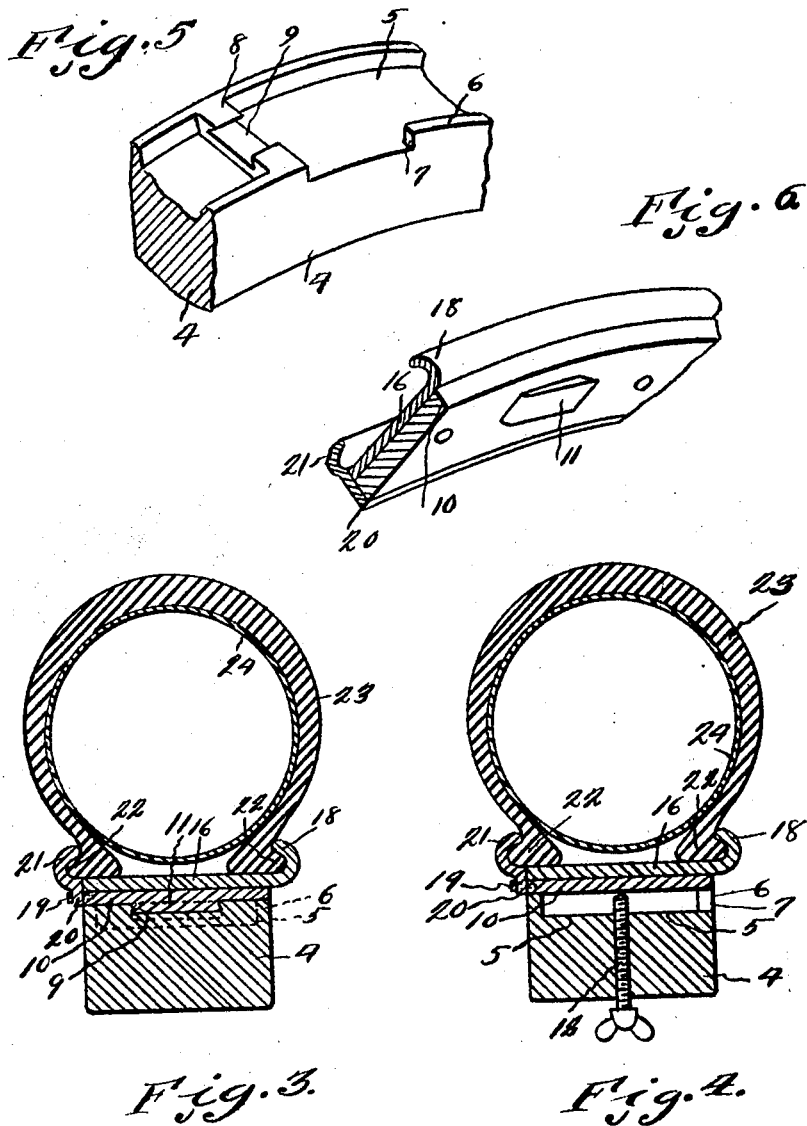

UNITED STATES PATENT OFFICE.

GEORGE L. SUMMERS, OF HUNTINGTON, WEST VIRGINIA.

DEMOUNTABLE RIM FOR AUTO-WHEELS.

1,292,139.

Specification of Letters Patent. Patented Jan. 21, 1919.

Application filed March 8, 1918. Serial No. 221,125.

*To all whom it may concern:*

Be it known that I, GEORGE L. SUMMERS, a citizen of the United States, residing at Huntington, in the county of Cabell, State of West Virginia, have invented a new and useful Demountable Rim for Auto-Wheels; and I do hereby declare the following to be a full, clear, and exact description of the invention, such as will enable others skilled in the art to which it appertains to make and use the same.

This invention relates to an improved demountable rim for automobile wheels, and one of the objects of the invention is to provide a simple, efficient and practical structure of this kind, whereby one rim may be easily replaced by another.

A further object of the invention is the provision of an improved demountable rim having efficient means for locking the rim to the fixed rim of the wheel, thereby preventing creeping of the rim when the wheel is in motion.

A further object of the invention is to provide a grooved fixed rim, provided in its groove with transverse members disposed at spaced intervals and having inclined faces, which constitute the bottoms of dove-tail recesses of said members, which recesses receive projections on the inner face of the demountable rim, whereby the rim and the fixed rim are locked together.

A further object of the invention is the provision of cutaway portions of the outer flange of the fixed rim, to permit the projections on the rim to pass, whereby the rim may be slipped on the fixed rim, subsequently to which the rim is given a partial turn thereby causing the inclined faces of said projections and the inclined faces of the dove-tail recesses to bind, there being means passing radially through the fixed rim and be projected behind said projections for locking the demountable rim on the fixed rim and prevent retrograde movement of the rim.

In practical fields the details of construction may necessitate alterations falling within the scope of what is claimed.

The invention comprises further features and combination of parts as hereinafter set forth, shown in the drawings and claimed.

In the drawings:—

Fig. 3 is a sectional view on line 3—3 of Fig. 1.

Fig. 4 is a sectional view on line 4—4 of Fig. 1.

Fig. 5 is a detail perspective view of a section of the fixed rim of the wheel, showing the transverse members and the dove tail recess.

Fig. 6 is a detail perspective view of a section of the demountable rim, showing one of said projections to coöperate with the transverse member of the fixed rim.

Figure 1:
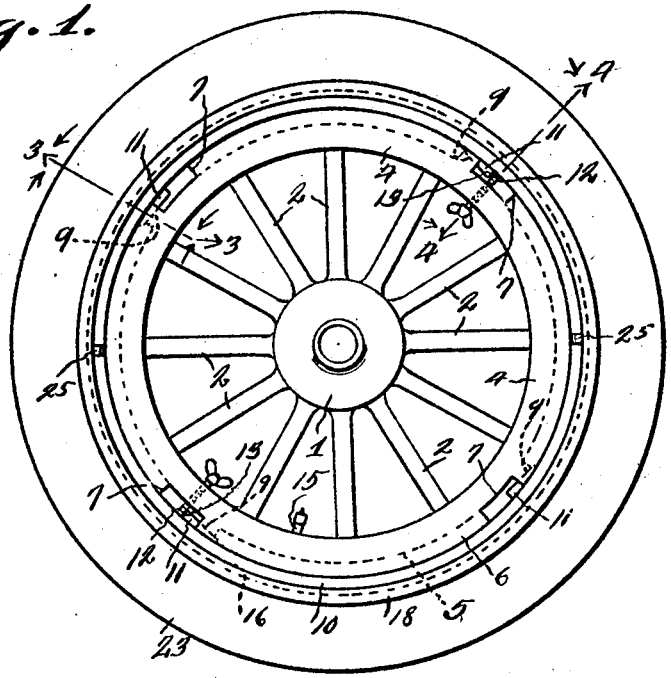
Figure 1 is a view in side elevation of an automobile wheel, showing the improved demountable rim as applied thereto.
Figure 2:
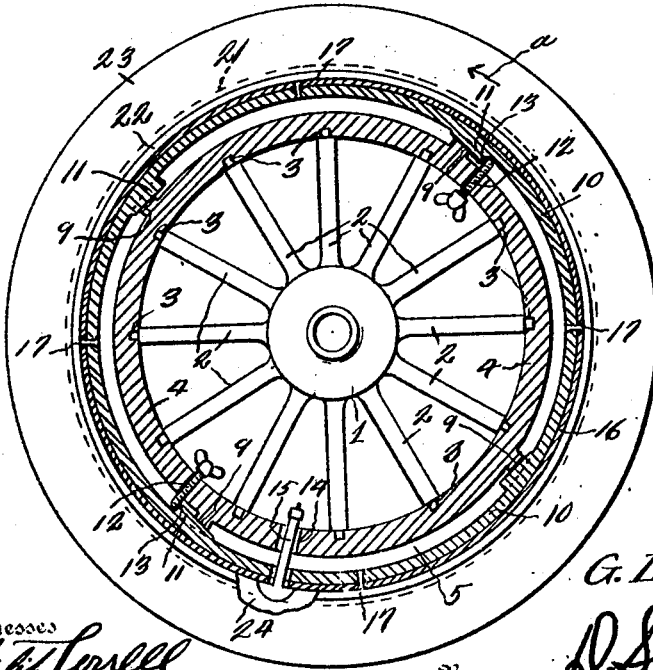
Fig. 2 is a view of a wheel, showing the spokes and the hub in elevation, and the fixed rim and the demountable rim (on which the outer casing of the tire is mounted in elevation) in section.

Referring more especially to the drawings, 1 designates a hub, which is provided with the usual spokes 2, which in turn are secured in any suitable manner as shown at 3 to the fixed rim 4. The outer face of the felly is provided with an annular groove 5. The outer flange 6 (which forms one side wall of the groove 5) of the fixed rim is provided with a series of cutaway portions 7, which are arranged at spaced intervals. Also arranged at spaced intervals and transversely of the groove 5 are transverse members or ribs provided with dove-tail recesses 9. The inner face of the demountable rim 10 is provided with elongated ribs 11 having their lengths extending concentrically with the center of the wheel. These ribs 11 are constructed to dove tail into the recesses 9 and assume positions at right angles to the members 8. The ribs 11 are arranged at spaced intervals to correspond with the arrangement of the cutaway portions 7, in order to pass through said cutaway portions, whereby the rim may be slipped or fitted on the fixed rim. The bottoms of the dove-tail recesses 9 and the faces of the ribs 11 are so inclined as shown in Fig. 2 as to insure a wedging lock between the demountable rim and the fixed rim. In order to make a wedging lock between the bottoms of the recesses 9 and the ribs 11 a partial turn is imparted to the demountable rim 10 in the direction of the arrow *a*. Threaded radially through the fixed rim diametrically opposite each other and adjacent diametric opposite cutaway portions 7 are winged screws 12, the outer extremities of which engage behind the ends 13 of two diametrically opposite ribs 11, thereby preventing retrogression of the rim after it has once received its partial turn to retain its wedging lock. The fixed rim 4 is provided with the usual opening 15, for the reception of the conventional form of inflating tube 15 of the tire. A suitable band 16 is riveted or otherwise secured at 17 to the rim 10. The outer edge of this band is provided with the usual clencher flange 18. Secured at 19 to the inner edge of the rim 10 is a ring 20, which is provided with a clencher flange 21. These clencher flanges 21 and 18 are designed to be engaged by the usual clencher ribs 22 of the outer tire casing 23, which receives the inner inflated tube 24. It is to be seen that a wheel equipped with a demountable rim constructed as shown as described, a punctured tire may be easily removed together with the demountable rim, in case the tire is punctured, and another rim applied, which carried an additional tire. The outer edge of the demountable rim is provided with diametrically oppositely disposed lugs 25, which are designed to be struck by a hammer or the like, to wedge the rim in place or to remove the same.

The invention having been set forth what is claimed as new and useful is:—

The combination with a fixed rim having its outer face provided with an annular channel, and adjoining side flanges forming the walls of said channel, the outer flange having cutaway portions arranged at spaced intervals, of a rim engaging the marginal cylindrical edges of said flanges and being firmly supported thereby, said channel having at spaced intervals and adjacent said cutaway portions transverse ribs, each of which being provided with a dove-tail recess, having its bottom inclined in a direction opposite to the rotation of the wheel, the inner-circumference of the second rim having at spaced intervals dove-tail ribs having their inner faces inclined in the direction of the rotation of the wheel, and adapted to engage said dove-tail recesses, the inclined bottoms of the recesses and the inclined faces of the second ribs acting to prevent displacement of the second rim in one direction, screws carried by the fixed rim radially and having their ends engaging behind the second ribs, thereby preventing displacement of the second rim in the opposite direction, said cutaway portions constituting means permitting of the passage of the second ribs when the second rim is slipped on the fixed rim.

In testimony whereof I have signed my name to this specification in the presence of two subscribing witnesses.

GEORGE L. SUMMERS.

Witnesses:
 CHAS. G. RHODES,
 CECIL WILLIAMS.